(12) United States Patent
Sukhman et al.

(10) Patent No.: US 9,737,958 B2
(45) Date of Patent: Aug. 22, 2017

(54) LASER MATERIAL PROCESSING SYSTEMS WITH BEAM POSITIONING ASSEMBLIES HAVING FLUIDIC BEARING INTERFACES AND ASSOCIATED APPARATUSES AND METHODS

(71) Applicant: Universal Laser Systems, Inc., Scottsdale, AZ (US)

(72) Inventors: Yefim P. Sukhman, Scottsdale, AZ (US); Stefano J. Noto, Mesa, AZ (US); Christian J. Risser, Scottsdale, AZ (US); Cody W. Petersen, Scottsdale, AZ (US); David T. Richter, Scottsdale, AZ (US); Matthew R. Ricketts, Phoenix, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 441 days.

(21) Appl. No.: 14/194,489

(22) Filed: Feb. 28, 2014

(65) Prior Publication Data
US 2015/0165552 A1  Jun. 18, 2015

Related U.S. Application Data

(60) Provisional application No. 61/916,045, filed on Dec. 13, 2013.

(51) Int. Cl.
  *B23K 26/04* (2014.01)
  *B23K 26/06* (2014.01)
  *B23K 26/08* (2014.01)
(52) U.S. Cl.
  CPC ........ *B23K 26/048* (2013.01); *B23K 26/0665* (2013.01); *B23K 26/0876* (2013.01)

(58) Field of Classification Search
  CPC ............................. B23K 26/0876; B23Q 1/38
  See application file for complete search history.

(56) References Cited

U.S. PATENT DOCUMENTS 3,635,532 A * 1/1972 Zerbola .................... B23Q 1/38
                                                184/5
5,040,431 A * 8/1991 Sakino ................ F16C 29/025
                                                108/143

(Continued)

OTHER PUBLICATIONS

New Way Air Bearings, "Air Bearing Application and Design Guide," 2006.*

*Primary Examiner* — David Angwin
*Assistant Examiner* — Erin McGrath
(74) *Attorney, Agent, or Firm* — Perkins Coie LLP

(57) ABSTRACT

Laser material processing systems having beam positioning assemblies with fluidic bearing interfaces and associated systems and methods are disclosed herein. In one embodiment, a laser material processing system includes a beam positioning assembly configured to position a laser beam. The beam positioning assembly includes a first linear guide having first guide surfaces and a second linear guide having second guide surfaces. The first linear guide is moveably coupled to the first linear guide via the first guide surfaces. The second linear guide is moveably coupled to a carriage via the second guide surfaces. At least one fluidic bearing interface is positioned to prevent direct physical contact between the second linear guide and at least one of the first guide surfaces and/or between the carriage and at least one of the second guide surfaces.

12 Claims, 5 Drawing Sheets

(56) References Cited

U.S. PATENT DOCUMENTS

| | | | | |
|---|---|---|---|---|
| 5,051,558 A | * | 9/1991 | Sukhman | B23K 26/0643 |
| | | | | 219/121.63 |
| 5,493,579 A | * | 2/1996 | Ressl | B23K 26/035 |
| | | | | 372/107 |
| 5,751,585 A | * | 5/1998 | Cutler | B23K 26/083 |
| | | | | 318/571 |
| 7,394,076 B2 | * | 7/2008 | Devitt | F16C 29/025 |
| | | | | 250/307 |
| 2008/0198485 A1 | * | 8/2008 | Kosmowski | B23K 26/0876 |
| | | | | 359/811 |
| 2008/0263841 A1 | * | 10/2008 | Stelzl | B21D 31/04 |
| | | | | 29/6.1 |
| 2009/0223944 A1 | * | 9/2009 | Sukhman | B08B 7/0042 |
| | | | | 219/121.84 |

* cited by examiner

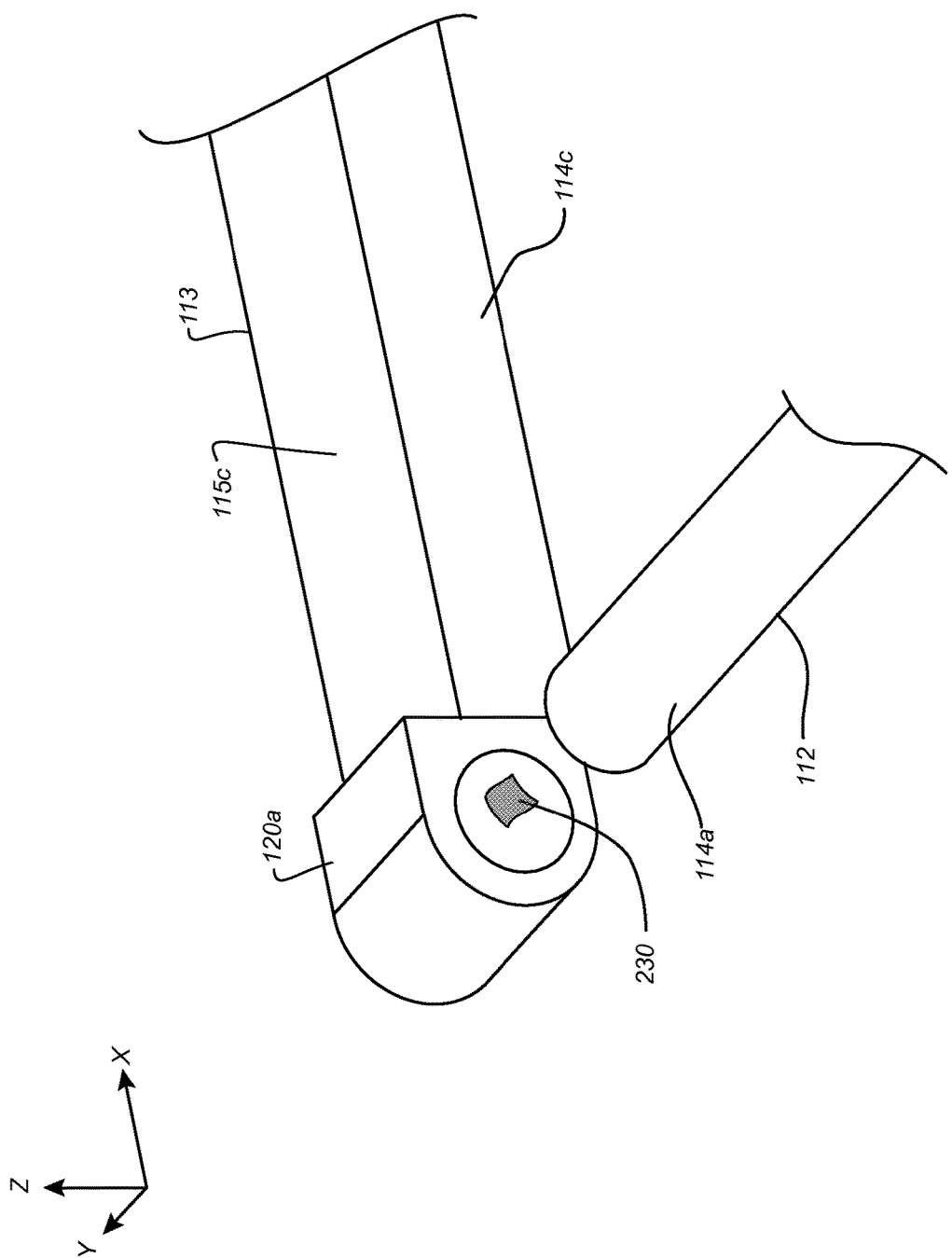

LASER MATERIAL PROCESSING SYSTEMS WITH BEAM POSITIONING ASSEMBLIES HAVING FLUIDIC BEARING INTERFACES AND ASSOCIATED APPARATUSES AND METHODS

CROSS-REFERENCE TO RELATED APPLICATIONS

The present application is a non-provisional of U.S. Application No. 61/916,045 filed on Dec. 13, 2013, which is incorporated herein by reference.

TECHNICAL FIELD

The present disclosure is directed generally to laser processing systems and, more specifically, to laser beam positioning assemblies, such as X-Y beam positioning assemblies.

BACKGROUND

Laser material processing systems can employ several components including a laser energy source, an optical path to deliver the laser energy to the material to be processed, a laser beam positioning assembly to direct laser energy to desired locations on the material, support for the material to be laser processed, and an enclosure to contain stray laser energy and capture any exhaust contaminants (smoke and debris) created when processing materials with laser energy.

BRIEF DESCRIPTION OF THE DRAWINGS

FIGS. 2A-2C are various blown-up, isometric views showing in more detail certain features of first and second linear guides of the laser processing system of FIG. 1.

DETAILED DESCRIPTION

Figure 1:
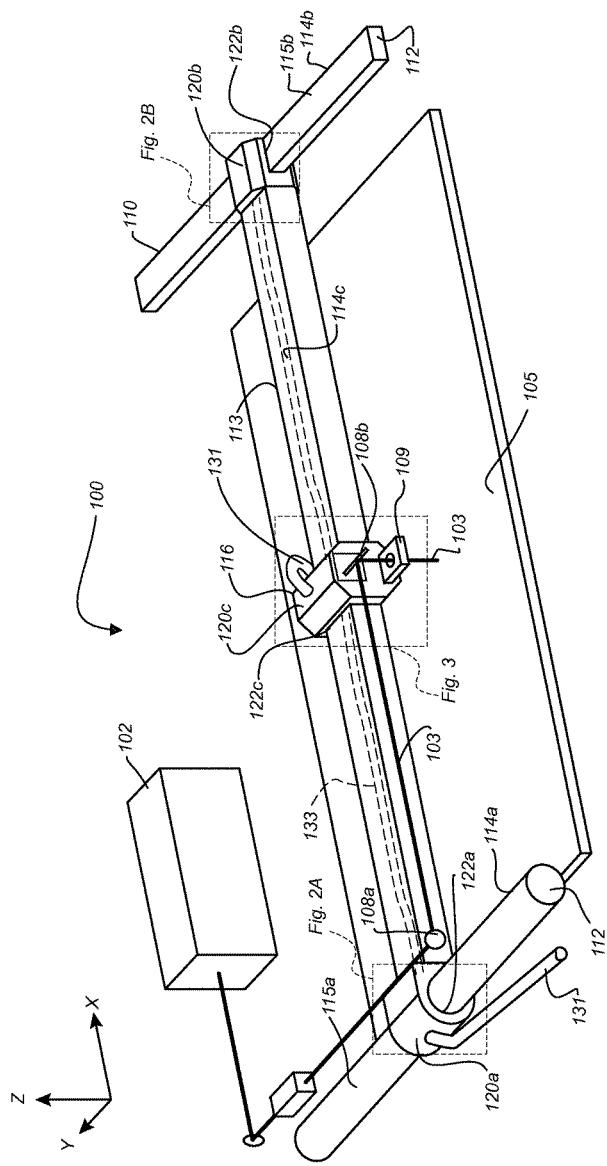
FIG. 1 is an isometric view of a laser processing system having fluidic bearing interfaces configured in accordance with an embodiment of the present technology.

The following disclosure describes various types of laser processing systems with beam positioning assemblies having fluidic bearing interfaces, and associated apparatuses and methods. Certain details are set forth in the following description and FIGS. 1-4 to provide a thorough understanding of various embodiments of the disclosure. Other details describing well-known structures and systems often associated with laser processing systems, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

In laser processing systems, material processing can produce significant amounts of contaminants, including volatile organic compounds (VOCs) and larger particulates. These contaminants can be released into the surrounding area from the point of interaction between the laser energy and the material to be processed. VOCs and other contaminants must be removed from the enclosure housing the laser and material processing components to prevent contamination of the laser beam positioning components as well as other components in the processing enclosure. In general, laser processing systems are configured to move a flow of air through the processing enclosure to draw contaminated air away from the processing enclosure and provide fresh, makeup air to the processing enclosure. Typically, laser processing systems remove contaminants using an air mover (e.g., a blower) that moves air through the processing enclosure to an exhaust vent.

Although the air moving through the processing enclosure can remove a substantial amount of contaminants, contamination can still build up on the laser beam positioning components. This buildup, if it becomes too thick, can interfere with performance of the positioning components. In general, laser beam positioning components can include, for example, optical components as well as motion components, such as bearings, linear rails, encoders, belts, gears and pulleys. These motion components are configured to move and locate the optical components. For example, the motion components can form a typical gantry-style X-Y laser beam positioning system having recirculating linear bearing rails and/or radial bearing wheels with groove arrangements. These components are typically located near the site of laser material processing and are configured to accurately locate and focus the laser energy on the material being processed.

Motion components, in particular, can be more susceptible to contamination. For example, performance of these components can degrade as they are exposed to contaminants from laser processing and eventually need replacement. The mechanism of contamination can include wear of the linear surfaces of the rails where wheels or bearings make contact due to the abrasive nature of some contaminants, buildup of contaminants between moving components, or buildup of contaminants in the grease used to lubricate moving components. Accordingly, laser processing systems configured in accordance with several embodiments of the present technology provide solutions that minimize buildup of contamination on motion components, including, for example, the guiding surfaces of rails in a linear motion system.

FIG. 1, for example, is an isometric view of a laser processing system 100 configured in accordance with an embodiment of the present technology. In the illustrated embodiment, the laser processing system 100 includes a laser source 102 and a multi-axis laser beam positioning assembly 110 ("positioning assembly 110") operably coupled to the laser source 102 (e.g., a $CO_2$ laser beam source). The positioning assembly 110 can include a first linear guide 112 carrying a second linear guide 113. The first linear guide 112 includes first and second rails 114a and 114b that include, respectively, at least one first guide surface 115a and at least one second guide surface 115b. The second linear guide 113 is moveably coupled to the first linear guide 112 and includes a third rail 114c (e.g., a crossbeam) having at least one third guide surface 115c. The positioning assembly 110 also includes a carriage 116 moveably coupled to the second linear guide 113. As described in greater detail below, the carriage 116 can be configured to direct a laser beam 103 toward a target material (not shown) at a work surface or work plane 105.

The second linear guide 113 is configured to move along a first beam positioning axis (the Y-axis directions in the illustrated embodiment) and the carriage 116 is configured to move along a second positioning axis (the X-axis directions in the illustrated embodiment). For example, the positioning assembly 110 can include, e.g., servo motors, pulleys, motor controllers and/or other components (not shown) configured to position the second linear guide 113 and the carriage 116. In various embodiments, laser beam optics (e.g., mirrors, lenses, collimators, etc.) can be operably coupled to the positioning assembly 110 to form a beam positioning path. For example, in the illustrated embodiment a first mirror 108a is mounted on the third rail 114c and a second mirror 108b and a focus lens 109 are mounted on the carriage 116. Accordingly, the laser beam 103 can be positioned anywhere within the X-Y field via the positioning assembly 110 and the laser beam optics.

In the illustrated embodiment, the second linear guide 113 further includes a first fluidic bearing 120a (e.g., a collar member) and a second fluidic bearing 120b (e.g., a clamp member) that are disposed toward opposite ends of the third rail 114c. The first fluidic bearing 120a is configured to form a first fluidic interface 122a between the second linear guide 113 and the first guide surface 115a, and the second fluidic bearing 120b is configured to form a second fluidic interface 122b between the second linear guide 113 and the second fluidic interface 122b. Similarly, the carriage 116 includes a third fluidic bearing 120c configured to define a third fluidic interface 122c between the carriage and the second linear guide 113. As described in greater detail below, the first through third fluidic bearings 120a-120c (collectively "fluidic bearings 120") can include a pressurized fluid permeable material configured to distribute a generally contaminant free compressed fluid at each of the first through third fluidic bearing interfaces 122a-122c (collectively "fluidic bearing interfaces 122"). The fluid can be provided by a fluid delivery conduit, such as a tube 131, connected to one or more of the fluidic bearings 120a-c by a connector (e.g., a fitting; not shown). In some embodiments, a portion of the tube 131 (shown in hidden lines) or a separate tube can also be routed internally through a hollow portion of one or more of the individual rails 114a-c to connect to one or more of the fluidic bearings 120a-c. The tube 131 or other suitable fluid delivery conduit can in turn be connected to a fluid source (e.g., a gas cylinder; not shown) fluidly coupled to the fluidic bearing. In one embodiment, the fluid can includes a gas. For example, in some embodiments the gas can include a pressurized inert gas (e.g., compressed nitrogen or air). In another embodiment, however, the fluid can include a liquid, such as an oil-based liquid. In further embodiments, the fluidic bearing can be configured to deliver a cleaning fluid or solution (e.g., a solvent) to one or more of the system components or guide surfaces. In some embodiments, the cleaning fluid can be delivered periodically (e.g. once an hour, day, week, month, etc.) to remove certain contaminants that might adhere to the surface and which cannot be easily or readily removed by the fluidic bearing and associated motion alone.

In one aspect of this embodiment, the fluidic bearing interfaces 122 are configured to prevent direct physical contact between the first linear guide 112 and the second linear guide 113 as well as direct physical contact between the second linear guide 113 and the carriage 116. In another aspect of this embodiment, the fluidic bearing interfaces 122 are configured to distribute the fluid to prevent contamination of the first through third guide surfaces 115a-115c (collectively "guide surfaces 115"). In particular, the permeable material of the individual fluidic bearings 122 distributes the fluid such that it drives contaminates away from the guide surfaces 115.

In use, the positioning assembly can improve performance of linear motion systems and reduce susceptibility to degradation in performance from contamination. In particular, the pressurized fluid permeable material at the fluidic bearings can form a thin film of fluid or gap at each of the fluidic bearing interfaces 122 (having, e.g., a thickness from about 5 to 30 micrometers). This gap of contaminant free compressed gas/air/liquid can allow for substantially frictionless motion between the moving parts. In one embodiment, the pressurized fluid permeable material can include graphite in between the surface of a linear rail and a moving carriage or cross beam to supplying contaminant free compressed gas/air to each of the fluidic interfaces. This arrangement has several advantages. For example, a thin gap between moving parts has the advantage of allowing a thin layer of contaminates to adhere to the rail without affecting motion if the layer is thinner than the gap formed by the contaminant free compressed gas/air. This arrangement also has the advantage of not requiring lubrication as there are no points of contact to wear out. Another advantage is that the contaminant free compressed gas/air escaping from the edges of the gap between the porous media and the rail helps to prevent contaminants from finding their way into the gap. In various embodiments, the fluidic bearings and/or the pressurized fluid permeable materials can take many forms.

Figure 2B:
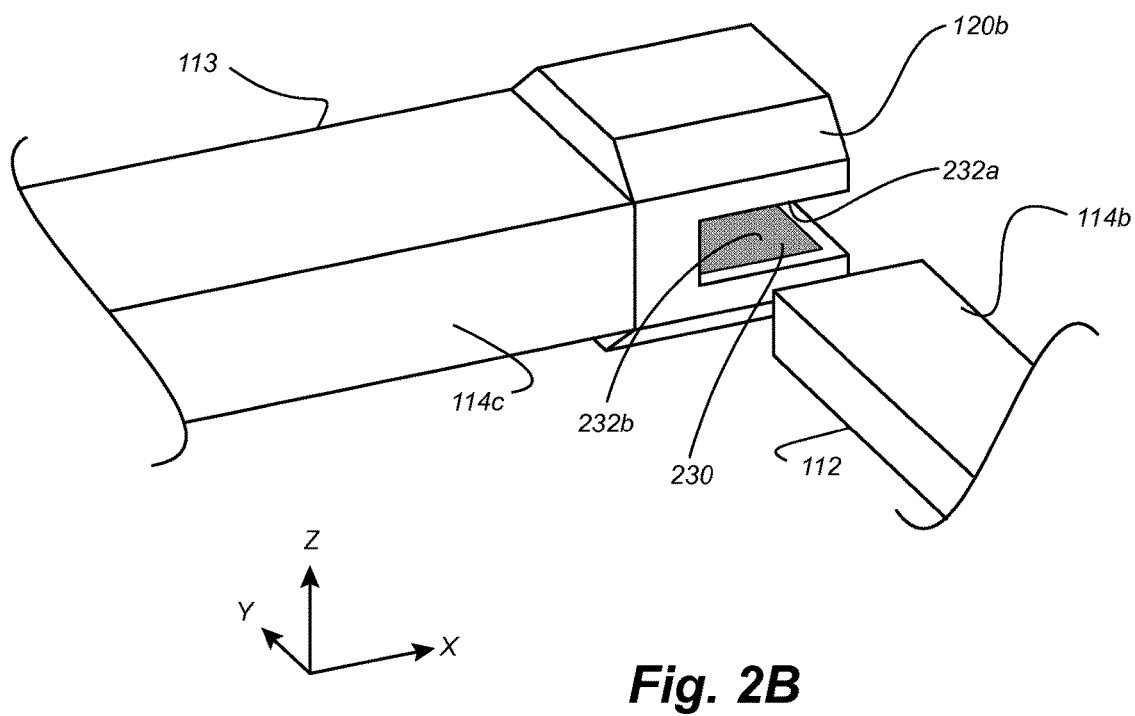
Figure 2C:
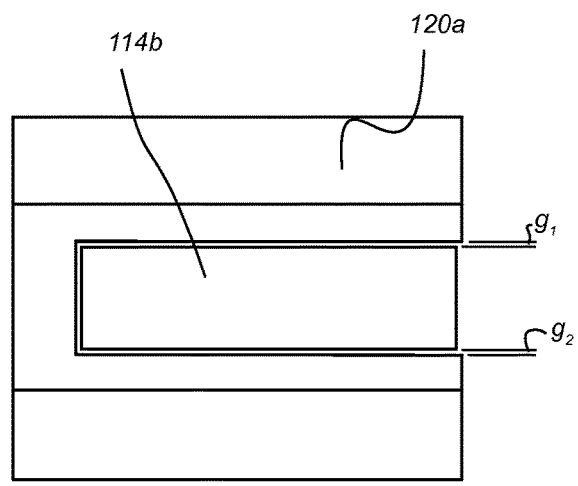

FIGS. 2A-2C are various blown-up, isometric views showing certain features of the first and second linear guides 112 and 113 in more detail. Referring first to FIG. 2A, the first rail 114a of the first linear guide 112 is cylindrically shaped and formed from a pressurized fluid permeable material 230. The first fluidic bearing 120a surrounds the first rail 114a such that the fluid distributed by a permeable material 230 forms a first gap (e.g., an air or liquid gap; not shown) surrounding the first rail 114a. In several embodiments, the fluid permeable material 230 can defines an inner surface that faces a guide surface of the rail. In several embodiments, the fluid permeable material 230 can include a porous material. For example, the permeable material 230 can include Graphitar® (manufactured by U.S. Graphite, Inc., Saginaw, Mich.).

Referring to FIGS. 2B-2C together, the second rail 114b of the first linear guide 112 is positioned between opposite sides of the second bearing element 120b. In the illustrated embodiment, the second bearing element 120b can contain one or more upper flat pads 232a and one or more lower flat pads 232b that are each formed from a pressurized fluid permeable material. Similar to the first rail 114a of FIG. 2A, the upper and lower flat pad 232a and 232b are configured to distribute the fluid to form gaps g1 and g2 (FIG. 2C) at opposite sides of the second rail 114b.

In one aspect of the embodiments of FIGS. 2A and 2B, the first fluidic bearing 120a is configured to constrain translation of the second linear guide to the Y-axis direction, but allow rotation about the Y-axis. The second fluidic bearing 120b, on the other hand, is configured to inhibit the rotation of the second linear guide about the Y-axis without constraining the translation of the second linear guide 113 in the Y-axis direction. For example, the second fluidic bearing 120b can "clamp" the one end of third rail 114c to the second rail 114b. In general, the configuration of the first and second fluidic bearings 120a and 120b in the illustrated embodiment can support the second linear guide 113 and provide sufficient degrees of freedom to allow the second linear guide 113 to move back and forth on the first linear guide 112.

Figure 3A:
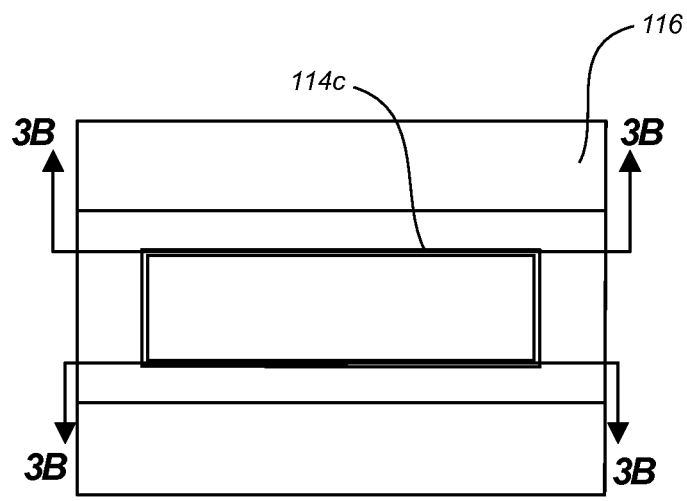
FIG. 3A is a side view.
Figure 3B:
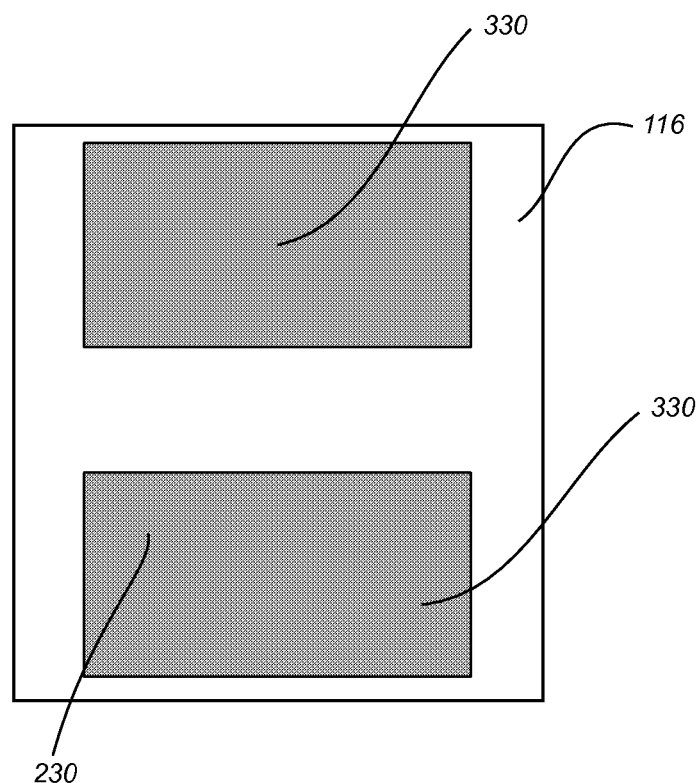
FIG. 3B is a bottom/top view of the showing in more detail certain features of a carriage of the laser processing system of FIG. 1.

FIG. 3A is a side view, and FIG. 3B is a bottom/top view of the carriage 116 showing certain features of the carriage 116 in more detail. Referring to FIGS. 3A and 3B together, the carriage 116 includes flat pads 330 of a pressurized fluid permeable material that surround third rail 114c on opposite sides that support the carriage 116 and form air gaps that allow the carriage 116 to move along the length of the third rail 114c.

Figure 4:
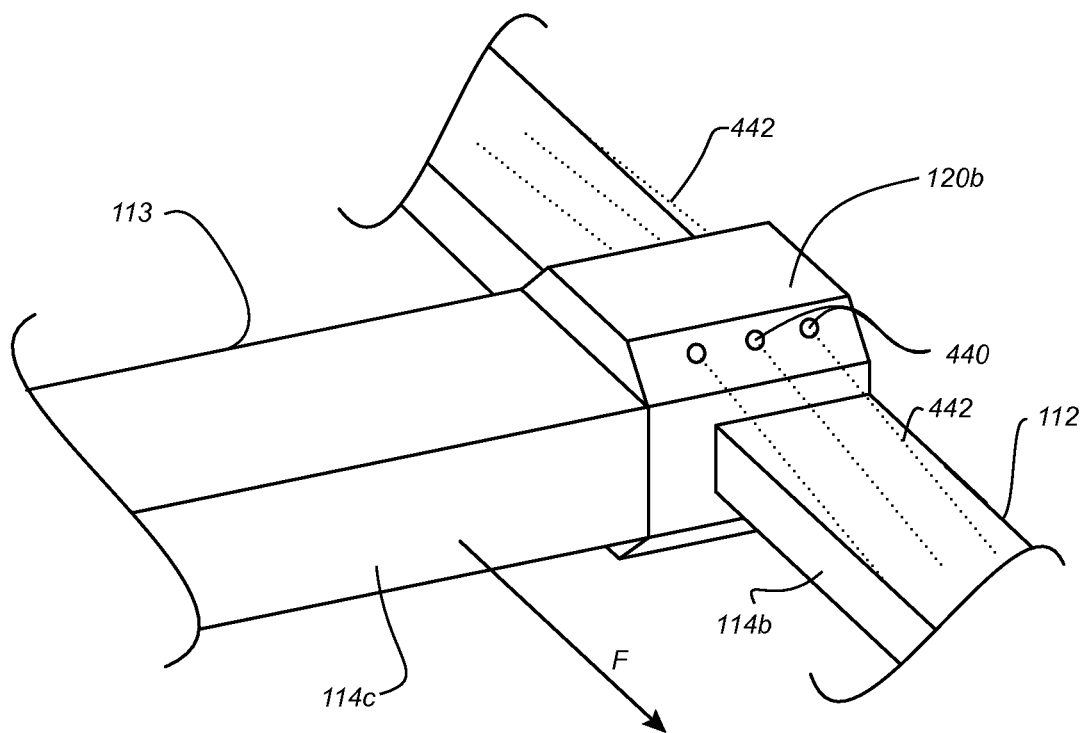
FIG. 4 is an isometric view of a fluidic bearing configured in accordance with another embodiment of the present technology.

FIG. 4 is an isometric view of a fluidic bearing 420 configured in accordance with another embodiment of the present technology. In this embodiment, the fluidic bearing 420 can include fluid nozzles 440 (e.g., high pressure jets) configured to direct fluid 442 onto the second guiding surface 114b of the second rail 114b in front of the fluidic bearing 420 in the direction of travel (as shown, e.g., by the arrow F). In use, the nozzles 440 can distribute the fluid 442 to "sweep" contaminants off of the rails. In one embodiment, the nozzles 440 can be configured to counteract a pumping effect related to contamination and encountered when a carriage or rail of a linear motion system moves at high speeds. The pumping effect is due to the creation of negative air-pressure behind the moving components as air moves in to fill the empty space formed behind the motion components. Ordinarily, this pumping action can draw in contaminates in the air so that they deposit on the surface of the linear rails. However, the nozzles 440 can be configured to direct the fluid 442 onto the guiding surfaces opposite to the direction of travel. In effect, the fluid moving in the opposite direction can supply makeup fluid. Because this makeup fluid has a velocity vector opposite to the contaminated air, it can fill in the stagnant area of fluid created behind a moving fluidic bearing.

From the foregoing, it will be appreciated that specific embodiments of the disclosure have been described herein for purposes of illustration, but that various modifications may be made without deviating from the spirit and scope of the various embodiments of the present technology. For example, in some embodiments the surfaces of the moving parts on the individual rails can be beveled or shaped in the direction(s) of travel to help guide air more efficiently over the moving parts so that the low and high pressure effects on the leading and trailing edges are reduced.

Moreover, because many of the basic structures and functions of laser processing systems are known, they have not been shown or described in further detail to avoid unnecessarily obscuring the described embodiments. For example, laser processing systems can have various configurations for cutting shapes or profiles out of materials, marking or preparing materials by removing or modifying surface layers of materials, and welding or sintering materials. In certain embodiments, a carriage can include a variety of focusing optics, such as reflective or refractive optics. Also, the carriage can include optics configured to combine beams. For example, such optics can be configured to combine a visible targeting beam with a material processing beam. In other embodiments, the carriage can include a sensor to measure and control the positioning of the material to be laser processed at the focal plane of the focusing optics. Such sensors can include, for example, photoelectric distance measuring sensors or ultrasonic distance measuring sensors.

Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure.

The invention claimed is:

1. A laser material processing system, comprising:
a laser source configured to provide a laser beam;
a multi-axis laser beam positioning assembly, including—
a first linear guide having one or more first guide surfaces,
a second linear guide moveably coupled to the first linear guide via the first guide surfaces, wherein the second linear guide has one or more second guide surfaces, and wherein the second linear guide is configured to position the laser beam along a first beam positioning axis, and
a carriage moveably coupled to the second linear guide via the second guide surfaces, wherein the carriage is configured to position the laser beam along a second beam positioning axis, and wherein the carriage includes focusing optics to focus the laser beam for laser processing of a target material;
at least one fluidic bearing interface having a fluid permeable material configured to distribute contaminant-free fluid for forming a gap, wherein the gap prevents direct physical contact between one of—
(1) the second linear guide and at least one of the first guide surfaces, and
(2) the carriage and at least one of the second guide surfaces,
wherein the fluid directs contaminants produced by the laser processing away from the gap; and
one or more nozzles proximate to the fluidic bearing interface, wherein the nozzles are configured to direct pressurized fluid onto at least one of the first and the second guide surfaces to facilitate removal of contaminants adjacent the gap.

2. The laser material processing system of claim 1 wherein the first linear guide includes a first rail and a second rail generally in parallel with the first rail, and wherein the second linear guide includes a third rail.

3. The laser material processing system of claim 2 wherein the fluidic bearing interface is between the first rail and the third rail, and wherein the laser material processing system further comprises a fluidic bearing at the fluidic bearing interface, wherein the fluidic bearing is configured to:
constrain translation of the third rail to the first beam positioning axis; and
allow rotation of the third rail about the first beam positioning axis, but not the second beam positioning axis.

4. The laser material processing system of claim 3 wherein the fluidic bearing is a first fluidic bearing, and wherein the laser material processing system further comprises a second fluidic bearing at a second fluidic bearing interface between the second rail and the third rail, wherein the second fluidic bearing is configured to inhibit the rotation of the third rail about the first beam positioning axis without constraining the translation of the third rail along the first beam positioning axis.

5. The laser material processing system of claim 1 wherein the fluid permeable material comprises graphite.

6. The laser material processing system of claim 5 wherein the fluid includes a gas.

7. The laser material processing system of claim 5 wherein the fluid includes a liquid.

8. The laser material processing system of claim 5 wherein the fluid includes a cleaning fluid.

9. The laser material processing system of claim 1 wherein the focusing optics are reflective.

10. The laser material processing system of claim 1 wherein the focusing optics are refractive.

11. The laser material processing system of claim 1 wherein the first linear guide includes a rail, wherein the fluidic bearing comprises a graphite collar member, and wherein the graphite collar member surrounds the rail of the first guide member.

12. The laser material processing system of claim 1 wherein the gap has a thickness from about 5 to 30 micrometers.

* * * * *